Feb. 11, 1930.  E. G. KIMMICH  1,746,701
FLEXIBLE CONDUIT AND METHOD OF MAKING THE SAME
Filed Aug. 3, 1926
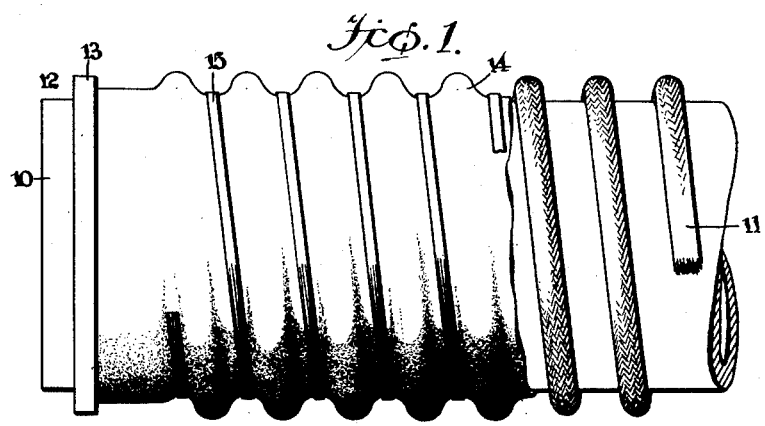
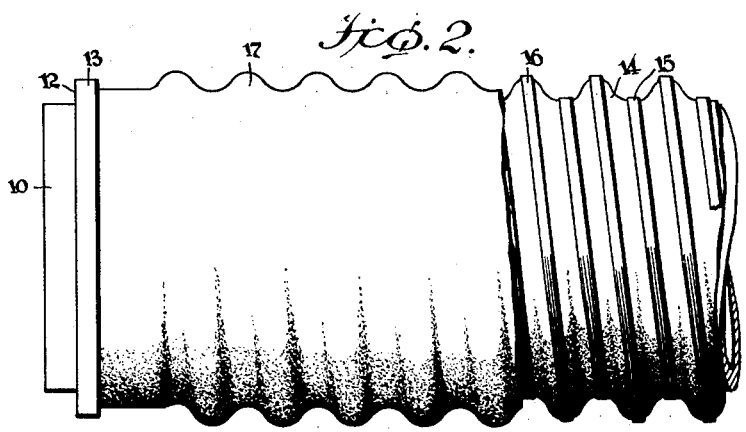
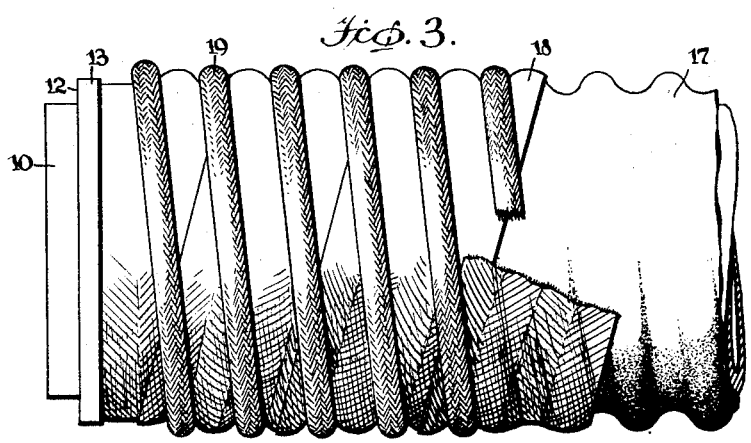
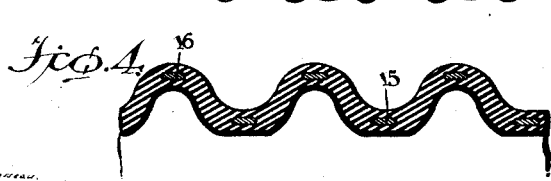
INVENTOR
E. G. Kimmich,
BY
ATTORNEY

UNITED STATES PATENT OFFICE

ELMER G. KIMMICH, OF AKRON, OHIO, ASSIGNOR TO THE GOODYEAR TIRE & RUBBER COMPANY, OF AKRON, OHIO, A CORPORATION OF OHIO

FLEXIBLE CONDUIT AND METHOD OF MAKING THE SAME

Application filed August 3, 1926. Serial No. 126,810.

My invention relates to the manufacture of flexible conduit and it has particular reference to the provision of a highly flexible conduit capable of withstanding heavy radially imposed loads, and to a method of preparing the article.

Flexible tubing is often utilized for conveying finely divided material, such as grain or dust, by employing suction through the conduit. Hose of this character is also useful in conveying liquids, such as water from the holds of ships. It is also employed to advantage for conducting fluid under pressure, such, for example, as compressed air to a pneumatically operated tool. In each of these applications, a highly flexible hose of light weight is desirable, as the service in which it is employed is of such nature as to require a continual change in the position of the conduit.

It is to be noted that flexible conduits should have a high strength in a radial direction to prevent bursting with attendant loss. Hose employed for conveying dust is subjected to a high atmospheric pressure applied radially toward the center. Hose utilized for conveying air under pressure must, however, withstand a high pressure which is directed radially outwardly. Flexible conduits employed for the conduction of liquids must not only be sufficiently strong to withstand the internal normal pressure, but they must be so constructed that they will not burst when the conduit is bent with the liquid confined therein. This requirement necessitates the provision of a tubing which may not only be bent readily, but which also has a high degree of elasticity.

Various types of flexible conduits have been proposed, but none of them, so far as I am aware, have been suitable for use in all of the classes of service illustrated by the foregoing examples. In certain constructions, strength has been sacrificed to attain flexibility, while other conduits have been so constructed that they could not withstand externally applied normal loads, although they could sustain high internal pressures.

It is one of the objects of the invention to provide a hose or conduit which shall be highly flexible and supple, and which is capable of withstanding loads applied either radially inwardly or outwardly, and it is a further object of the invention to provide an efficient method for making the conduit.

Additional objects and advantages will become apparent from the following detailed description of a preferred form of practicing the invention, wherein reference is made to the accompanying drawing, in which Fig. 1 is a fragmentary plan view of the conduit as it appears during an early stage of its construction, parts being broken away for the sake of clearness;

Fig. 2 is a fragmentary plan view of the conduit as it appears in a more advanced stage of construction, parts being broken away for the sake of clearness;

Fig. 3 is a fragmentary plan view of the conduit as it appears in the final stages of its construction, parts being broken away for the sake of clearness; and Fig. 4 is a fragmentary longitudinal cross-sectional view of the completed article.

Preferably, the hose is formed in straight lengths by building it upon a hollow cylindrical pole or mandrel indicated by the reference numeral 10. A band, such, for example, as a rope 11, of suitable diameter to form convolutions in the hose, is wrapped in the form of a helix around the mandrel, and the ends are secured thereto by any suitable means, as, for example, by means of a piece of tape. It has been found that the proper flexibility may be imparted to the hose, for the different diameters in which it may be constructed, by spacing the turns at a distance equal to about twice the diameter of the rope.

Positioned on the mandrel 10, adjacent the ends of the rope 11, are collars 12 having annular flanges 13. These members are employed in order to form a cylindrical portion at either end of the hose for the attachment of suitable couplings, and they are also advantageous to facilitate the removal of the hose from the mandrel in a manner which will be subsequently apparent.

A ply of rubberized fabric 14, preferably cut on a bias, is then wrapped loosely over the helix 11 positioned on the mandrel 10, with its edges overlapping the flanges 13 on the collars 12. While it is preferred to apply the fabric ply 14 cylindrically, satisfactory results may also be obtained by wrapping the fabric helically around the mandrel. The loose end of the rubberized fabric 14 may be secured to the body thereof by attaching to it a gum strip or a ribbon of unvulcanized tacky rubber.

When the fabric ply 14 is so positioned, it is pulled tightly into the spaces between the successive convolutions of the rope 11, preferably by means of a wire 15, which is also employed as a reinforcing element. The wire should have sufficient temper to lie snugly against the fabric, and it should be applied with sufficient force to remove the looseness in the fabric 14, and to cause it to follow closely the contour of the mandrel 10 with the rope 11 positioned thereon. This phase of the construction is illustrated in Fig. 1 of the drawing.

A second wire 16 is then applied to the inner ply 14, in the same manner as the wire 15, but it is disposed directly on top of the convolutions of the rope 11, instead of between the successive turns. With this construction, there is provided a conduit having a high flexibility, by virtue of its corrugated surface, and which is adapted to withstand both internal and external radial loads, because of the provision of the respective reinforcing elements disposed at the crests and the troughs of the successive convolutions.

An additional wrapping or outer ply 17 of bias cut rubberized fabric is then positioned over the mandrel in the same manner as the inner envelope or ply 14, as illustrated in Fig. 2.

To the assembly thus formed, there is applied a helical wrapping of fabric 18, which is wound tightly upon the conduit and which is pulled into place by means of a rope 19, that is also helically wound upon the mandrel to follow the intervals between the convolutions of the inner rope 11. The rope 19 is secured in position, and the mandrel 10, with the hose assembled thereon, is then subjected to a vulcanizing temperature, in order to form a unitary article.

When the vulcanizing operation is completed, the rope 19, the fabric wrapping 18, and the collars 12 are removed. The mandrel 10 is then withdrawn from within the hose, an operation which is facilitated by applying air pressure in the space between the inner ply 14 and the face of the mandrel 10 adjacent the end of the hose. If it be found that difficulty is experienced in removing the conduit, graphite may be applied to the surface of the mandrel, before the essembly is undertaken. This material serves to lubricate the surface of the cylinder 10 and hence, facilitates its subsequent removal.

The rope 11 may then be pulled from the interior of the hose to leave the finished article, shown in fragmentary section in Fig. 4. It will be apparent from this view that there is provided a corrugated conduit of unitary construction, which is highly flexible, and which is reinforced against loads applied either radially inwardly or outwardly, by means of the helical convolutions or reinforcing wires 15 and 16. The wires themselves are protected from displacement, inasmuch as they are wholly disposed between the plies of fabric material 14 and 17 constituting the walls of the conduit. The tubing is relatively light in weight, flexible and resistant to crushing forces.

From the foregoing description, it will be apparent that there is provided a novel and useful article of manufacture which may be employed in various types of service, and which is applicable to a greater variety of uses than similar articles which have been employed heretofore. Obviously, the precise construction illustrated need not be employed to obtain all of the advantages inherent in the invention, nor need the method be followed in all of its details to obtain a satisfactory article. It is to be understood, therefore, that the invention is not to be limited to the precise means shown and described, which are intended primarily for the purposes of illustration. Only such limitations should be imposed upon the invention as are set forth in the following claims.

What I claim is:

1. A flexible conduit comprising corrugated inner and outer envelopes, and reinforcing means helically disposed between the envelopes, the interior surface of the inner envelope being free from reinforcements.

2. A flexible conduit comprising corrugated inner and outer envelopes, a reinforcing helix wound in the crests of the corrugations, and a separate reinforcing helix wound in the troughs of the corrugations.

3. A conduit having helically corrugated inner and outer surfaces, comprising an inner ply of material, reinforcing wires disposed at the crests and in the troughs of the corrugations, and an outer ply of rubberized material, the whole being vulcanized to form a unitary structure that is highly flexible and which is highly resistant to normally applied loads.

4. A flexible conduit having corrugated inner and outer surfaces, and reinforcing means helically disposed within the body of the conduit at the crests of the corrugations, the interior surface of the inner envelope being free from reinforcements.

In witness whereof, I have hereunto signed my name.

ELMER G. KIMMICH.